United States Patent
Fay et al.

(10) Patent No.: US 9,762,354 B2
(45) Date of Patent: Sep. 12, 2017

(54) SIGNALING METHODS AND APPARATUS

(71) Applicant: Sony Corporation, Tokyo (JP)

(72) Inventors: Luke Fay, San Diego, CA (US); Lachlan Michael, Saitama (JP); Daniel Schneider, Stuttgart (DE); Lothar Stadelmeier, Stuttgart (DE); Samuel Atungsiri, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/806,243

(22) Filed: Jul. 22, 2015

(65) Prior Publication Data
US 2016/0218829 A1 Jul. 28, 2016

Related U.S. Application Data

(60) Provisional application No. 62/108,410, filed on Jan. 27, 2015.

(51) Int. Cl.
| | |
|---|---|
| *H04L 27/00* | (2006.01) |
| *H04L 1/00* | (2006.01) |
| *H04L 27/26* | (2006.01) |
| *H04H 60/13* | (2008.01) |
| *H04H 60/73* | (2008.01) |
| *H04L 5/00* | (2006.01) |

(Continued)

(52) U.S. Cl.
CPC ........... *H04L 1/0083* (2013.01); *H04H 60/13* (2013.01); *H04H 60/73* (2013.01); *H04L 27/2602* (2013.01); *H04L 27/2613* (2013.01); *H04L 27/2636* (2013.01); *H04L 27/2666* (2013.01); *H04H 20/59* (2013.01); *H04H 60/72* (2013.01); *H04L 5/0044* (2013.01); *H04L 5/0048* (2013.01)

(58) Field of Classification Search
CPC .............. H04L 1/0083; H04L 27/2636; H04L 27/2601; H04L 5/023; H04L 27/2666; H04L 25/00; H04L 1/0045; H04B 1/00; H03K 5/153
USPC ....... 375/260, 262, 285, 295, 316, 340, 342, 375/346; 370/210, 252, 345, 350, 465, 370/470, 473, 496
See application file for complete search history.

(56) References Cited

U.S. PATENT DOCUMENTS

| | | |
|---|---|---|
| 8,117,638 B2 | 2/2012 | Perlman |
| 8,595,783 B2 | 11/2013 | Dewa |
| 8,666,387 B2 | 3/2014 | Tee et al. |

(Continued)

OTHER PUBLICATIONS

International Search Report and Written Opinion with Search History issued Feb. 23, 2016 in PCT/US2015/064640.

(Continued)

*Primary Examiner* — Khanh C Tran
(74) *Attorney, Agent, or Firm* — Oblon, McClelland, Maier & Neustadt, L.L.P.

(57) ABSTRACT

A transmission apparatus and transmitting method for signaling parameters of a part of a frame, and a reception apparatus and receiving method for decoding a part of a transmission frame. The transmitting method includes generating, using processing circuitry of a transmission apparatus, a transmission frame. The transmission frame includes a plurality of parts. A last symbol in a first one of the plurality of parts includes signaling information for decoding a second one of the plurality of parts. The transmitting method further includes transmitting the transmission frame using the processing circuitry.

20 Claims, 11 Drawing Sheets

(51) Int. Cl.
*H04H 20/59* (2008.01)
*H04H 60/72* (2008.01)

(56) References Cited

U.S. PATENT DOCUMENTS

| | | | |
|---|---|---|---|
| 8,705,933 B2 | 4/2014 | Eyer | |
| 8,839,338 B2 | 9/2014 | Eyer | |
| 8,842,974 B2 | 9/2014 | Kitazato | |
| 8,863,171 B2 | 10/2014 | Blanchard et al. | |
| 8,872,888 B2 | 10/2014 | Kitazato | |
| 8,875,169 B2 | 10/2014 | Yamagishi | |
| 8,875,204 B2 | 10/2014 | Kitazato | |
| 8,884,800 B1 | 11/2014 | Fay | |
| 8,886,009 B2 | 11/2014 | Eyer | |
| 8,892,636 B2 | 11/2014 | Yamagishi | |
| 8,893,210 B2 | 11/2014 | Eyer | |
| 8,896,755 B2 | 11/2014 | Kitazato et al. | |
| 8,898,720 B2 | 11/2014 | Eyer | |
| 8,898,723 B2 | 11/2014 | Eyer | |
| 8,904,417 B2 | 12/2014 | Kitahara et al. | |
| 8,908,103 B2 | 12/2014 | Kitazato | |
| 8,909,694 B2 | 12/2014 | Yamagishi et al. | |
| 8,914,832 B2 | 12/2014 | Yamagishi | |
| 8,918,801 B2 | 12/2014 | Kitazato et al. | |
| 8,918,828 B2 | 12/2014 | Eyer | |
| 8,925,016 B2 | 12/2014 | Eyer | |
| 8,930,988 B2 | 1/2015 | Kitazato et al. | |
| 8,938,756 B2 | 1/2015 | Kitazato | |
| 8,941,779 B2 | 1/2015 | Eyer | |
| 8,966,564 B2 | 2/2015 | Kitazato | |
| 8,988,612 B2 | 3/2015 | Kitazato | |
| 9,015,785 B2 | 4/2015 | Yamagishi | |
| 9,038,095 B2 | 5/2015 | Fay et al. | |
| 9,043,857 B2 | 5/2015 | Dewa | |
| 9,078,031 B2 | 7/2015 | Kitazato et al. | |
| 9,130,812 B2* | 9/2015 | Taghavi Nasrabadi | H04L 5/0023 |
| 2002/0067782 A1* | 6/2002 | Wilhelmsson | H04L 1/18 375/342 |
| 2008/0285513 A1 | 11/2008 | Jung et al. | |
| 2011/0044393 A1* | 2/2011 | Ko | H04L 5/0053 375/260 |
| 2011/0088075 A1 | 4/2011 | Eyer | |
| 2011/0243536 A1 | 10/2011 | Eyer | |
| 2011/0246488 A1 | 10/2011 | Eyer | |
| 2011/0247028 A1 | 10/2011 | Eyer | |
| 2011/0298981 A1 | 12/2011 | Eyer | |
| 2011/0299827 A1 | 12/2011 | Eyer | |
| 2011/0302599 A1 | 12/2011 | Eyer | |
| 2011/0302611 A1 | 12/2011 | Eyer | |
| 2012/0050619 A1 | 3/2012 | Kitazato et al. | |
| 2012/0054214 A1 | 3/2012 | Yamagishi et al. | |
| 2012/0054235 A1 | 3/2012 | Kitazato et al. | |
| 2012/0060197 A1 | 3/2012 | Kitahara et al. | |
| 2012/0063443 A1* | 3/2012 | Park | H04H 60/00 370/345 |
| 2012/0063508 A1 | 3/2012 | Hattori et al. | |
| 2012/0072965 A1 | 3/2012 | Dewa | |
| 2012/0081607 A1 | 4/2012 | Kitazato | |
| 2012/0084802 A1 | 4/2012 | Kitazato | |
| 2012/0185888 A1 | 7/2012 | Eyer et al. | |
| 2012/0253826 A1 | 10/2012 | Kitazato et al. | |
| 2013/0024894 A1 | 1/2013 | Eyer | |
| 2013/0036440 A1 | 2/2013 | Eyer | |
| 2013/0055313 A1 | 2/2013 | Eyer | |
| 2013/0103716 A1 | 4/2013 | Yamagishi | |
| 2013/0191860 A1 | 7/2013 | Kitazato et al. | |
| 2013/0201399 A1 | 8/2013 | Kitazato et al. | |
| 2013/0205327 A1 | 8/2013 | Eyer | |
| 2013/0212634 A1 | 8/2013 | Kitazato | |
| 2013/0254824 A1 | 9/2013 | Eyer | |
| 2013/0265494 A1* | 10/2013 | Mourad | H04W 72/04 348/571 |
| 2013/0282870 A1 | 10/2013 | Dewa et al. | |
| 2013/0283311 A1 | 10/2013 | Eyer | |
| 2013/0283328 A1 | 10/2013 | Kitazato | |
| 2013/0291022 A1 | 10/2013 | Eyer | |
| 2013/0340007 A1 | 12/2013 | Eyer | |
| 2014/0013347 A1 | 1/2014 | Yamagishi | |
| 2014/0013379 A1 | 1/2014 | Kitazato et al. | |
| 2014/0040965 A1 | 2/2014 | Kitazato et al. | |
| 2014/0040968 A1 | 2/2014 | Kitazato et al. | |
| 2014/0043540 A1 | 2/2014 | Kitazato et al. | |
| 2014/0053174 A1 | 2/2014 | Eyer et al. | |
| 2014/0067922 A1 | 3/2014 | Yamagishi et al. | |
| 2014/0099078 A1 | 4/2014 | Kitahara et al. | |
| 2014/0122528 A1 | 5/2014 | Yamagishi | |
| 2014/0137153 A1 | 5/2014 | Fay et al. | |
| 2014/0137165 A1 | 5/2014 | Yamagishi | |
| 2014/0150040 A1 | 5/2014 | Kitahara et al. | |
| 2014/0157304 A1 | 6/2014 | Fay et al. | |
| 2014/0169359 A1* | 6/2014 | Wu | H04W 52/0212 370/345 |
| 2014/0186008 A1 | 7/2014 | Eyer | |
| 2014/0208375 A1 | 7/2014 | Fay et al. | |
| 2014/0208380 A1 | 7/2014 | Fay et al. | |
| 2014/0229580 A1 | 8/2014 | Yamagishi | |
| 2014/0229979 A1 | 8/2014 | Kitazato et al. | |
| 2014/0253683 A1 | 9/2014 | Eyer et al. | |
| 2014/0327825 A1 | 11/2014 | Eyer | |
| 2014/0341103 A1 | 11/2014 | Hwang et al. | |
| 2014/0348488 A1 | 11/2014 | Eyer | |
| 2014/0351877 A1 | 11/2014 | Eyer | |
| 2014/0354890 A1 | 12/2014 | Eyer | |
| 2015/0007215 A1 | 1/2015 | Fay et al. | |
| 2015/0007219 A1 | 1/2015 | Blanchard et al. | |
| 2015/0007242 A1 | 1/2015 | Fay | |
| 2015/0012588 A1 | 1/2015 | Yamagishi | |
| 2015/0012955 A1 | 1/2015 | Kitazato | |
| 2015/0020146 A1 | 1/2015 | Eyer | |
| 2015/0026730 A1 | 1/2015 | Eyer | |
| 2015/0026739 A1 | 1/2015 | Kitazato | |
| 2015/0033280 A1 | 1/2015 | Fay | |
| 2015/0038100 A1 | 2/2015 | Fay | |
| 2015/0046937 A1 | 2/2015 | Kitazato et al. | |
| 2015/0046942 A1 | 2/2015 | Eyer | |
| 2015/0058410 A1 | 2/2015 | Yamagishi et al. | |
| 2015/0058875 A1 | 2/2015 | Kitahara et al. | |
| 2015/0058906 A1 | 2/2015 | Kitazato et al. | |
| 2015/0058911 A1 | 2/2015 | Kitazato et al. | |
| 2015/0062428 A1 | 3/2015 | Eyer | |
| 2015/0067713 A1 | 3/2015 | Yamagishi | |
| 2015/0074704 A1 | 3/2015 | Kitazato | |
| 2015/0082367 A1 | 3/2015 | Kitazato | |
| 2015/0100997 A1 | 4/2015 | Kitazato | |
| 2015/0163557 A1 | 6/2015 | Kitazato | |
| 2015/0195605 A1 | 7/2015 | Eyer | |
| 2015/0215673 A1 | 7/2015 | Yamagishi | |
| 2015/0229507 A1* | 8/2015 | Kim | H04L 27/2692 375/260 |
| 2015/0304070 A1* | 10/2015 | Baek | H03M 13/27 375/295 |
| 2015/0341052 A1* | 11/2015 | Jeong | H03M 13/1102 714/776 |
| 2015/0341053 A1* | 11/2015 | Kim | H03M 13/1102 714/776 |
| 2015/0341054 A1* | 11/2015 | Myung | H03M 13/1102 714/776 |
| 2016/0197759 A1* | 7/2016 | Baek | H04L 27/2627 375/340 |
| 2016/0234867 A1* | 8/2016 | Kwak | H04H 60/48 |

OTHER PUBLICATIONS

Ana Cinta Oria, et al., "L1 signaling mobility performance in the DVB-T2 receivers intercarrier interference cancellation method applied to L1 signaling" DCIS'12 Special Issue, Microelectronics Journal, vol. 45, No. 10, Oct. 2014, 2 Pages (submitting Abstract only).
U.S. Appl. No. 14/295,695, filed Jun. 4, 2014, Eyer.
U.S. Appl. No. 14/566,574, filed Dec. 10, 2014, Fay.
U.S. Appl. No. 14/680,752, filed Apr. 7, 2015, Eyer.

(56) References Cited

OTHER PUBLICATIONS

U.S. Appl. No. 14/686,277, filed Apr. 14, 2015, Fay et al.
U.S. Appl. No. 14/689,825, filed Apr. 17, 2015, Dewa.
U.S. Appl. No. 14/735,879, filed Jun. 10, 2015, Kitazato et al.
U.S. Appl. No. 14/741,168, filed Jun. 16, 2015, Eyer.
U.S. Appl. No. 14/746,541, filed Jun. 22, 2015, Lachlan et al.
U.S. Appl. No. 14/810,004, filed Jul. 27, 2015, Eyer et al.

* cited by examiner

SIGNALING METHODS AND APPARATUS

CROSS-REFERENCE TO RELATED APPLICATIONS

This application claims the benefit of priority from U.S. Provisional Application No. 62/108,410 filed Jan. 27, 2015, the entire contents of which are incorporated herein by reference.

TECHNICAL FIELD

The present disclosure relates to methods and apparatuses for signaling parameters in a communication system.

BACKGROUND

Television broadcasting has evolved from basic analogue terrestrial broadcast television to complex digital systems. Wireless communication techniques are central to the development of the complex digital systems. There exists several wideband digital communication techniques depending on a broadcasting method used. For example, direct sequence spread spectrum (DSSS) and orthogonal frequency-division multiplexing (OFDM) are one of the latest schemes in wideband digital communication systems. OFDM is a method of encoding digital data on multiple carrier frequencies and is used in applications such as digital television and audio broadcasting, Digital Subscriber Line (DSL) internet access, wireless networks, power line networks, and 4G mobile communications. OFDM has been selected as the wireless technique for the current generation of terrestrial television broadcast standards such as DVB-T2 and emerging standards such as ATSC 3.0.

A broadcasting standard may allow many modes of operations to be determined by the broadcaster. Thus, signaling parameters are needed by the receiver to decode efficiently, and correctly the received data. As recognized by the present inventors, there is a need to transmit signaling parameters.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure. The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

According to an embodiment of the present disclosure, there is provided a method for signaling parameters. The method includes generating using processing circuitry, a transmission frame. The transmission frame includes a plurality of parts. A last symbol in a first one of the plurality of parts includes signaling information for decoding a second one of the plurality of parts. The method further includes transmitting, using the processing circuitry, the transmission frame.

According to an embodiment of the present disclosure, there is provided a transmission apparatus, including a memory and circuitry. The circuitry is configured to generate a transmission frame. The transmission frame includes a plurality of parts. A last symbol in a first one of the plurality of parts includes signaling information for decoding a second one of the plurality of parts. The circuitry is further configured to transmit the transmission frame.

According to an embodiment of the present disclosure, there is provided a non-transitory computer-readable medium storing instructions, which when executed by a computer, causes the computer to perform the method for signaling parameters, as described above.

According to an embodiment of the present disclosure, there is provided a method for decoding a part of a transmission frame. The method includes detecting, using processing circuitry of a reception apparatus, a last symbol of a first part of the transmission frame. The method further includes extracting, using the processing circuitry, signaling parameters to decode a second part of the transmission frame from the last symbol of the first part of the transmission frame.

According to an embodiment of the present disclosure, there is provided a reception apparatus including a memory and circuitry. The circuitry is configured to detect a last symbol of a first part of the transmission frame. The circuitry is further configured to extract signaling parameters to decode a second part of the transmission frame from the last symbol of the first part of the transmission frame.

According to an embodiment of the present disclosure, there is provided a non-transitory computer readable medium storing instructions, which when executed by a computer, causes the computer to perform the method for decoding a part of a transmission frame as described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
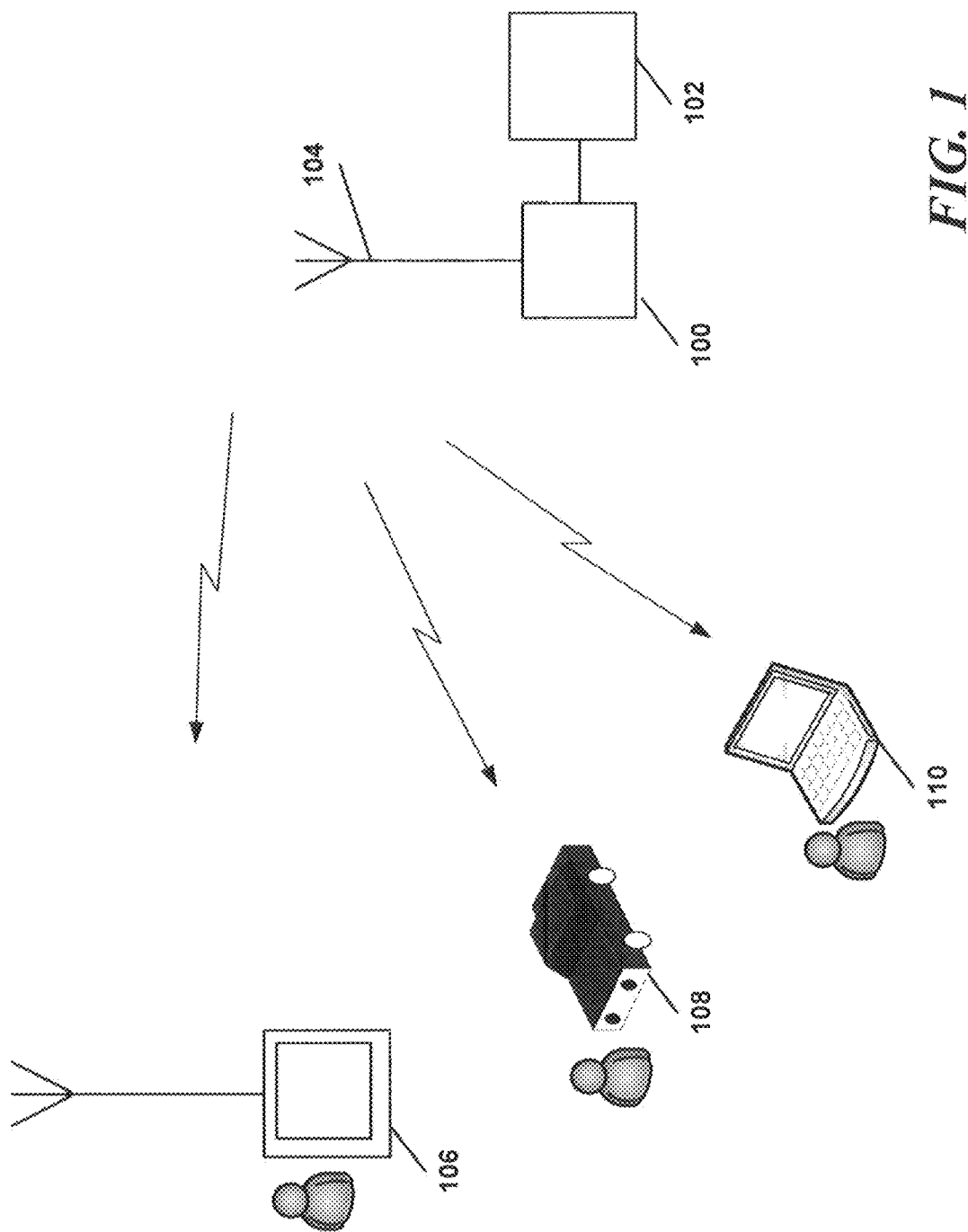
FIG. 1 is an exemplary system for broadcasting and receiving communication signals according to one example.

While the present disclosure is susceptible of embodiment in many different forms, there is shown in the drawings and will herein be described in detail specific embodiments, with the understanding that the present disclosure of such embodiments is to be considered as an example of the principles and not intended to limit the present disclosure to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The following description relates to methods and apparatuses for signaling parameters in a communication system.

FIG. 1 is an exemplary system for broadcasting and receiving communication signals according to one example. The communication signals may represent data where the communication signals may be digital television signals (e.g., terrestrial television broadcast signals). The communication system includes a transmitter 100, a core network 102, an antenna 104, and a plurality of user devices. The user devices may be televisions sets 106, mobile handsets, personal video recorders or others devices configured to receive a communication signal. Each of the user devices includes an antenna to receive the communication signal. The user device includes reception circuitry. The reception circuitry may also be included in a vehicle 108 or a computer 110. The core network 102 includes a signal source such as for example a television studio camera that captures video and audio data and converts the data into a signal which is transmitted to the transmitter 100. The transmitter 100 processes the signal received from the core network 102 to transform the signal into a form suitable for transmission.

The signals carrying the data may be transmitted to the user devices over a terrestrial broadcast, a cable connection or a satellite link. The system may use any one or a variety of transmission techniques to communicate data to the user devices, for example the system may use a single or multicarrier technique.

The broadcasting system may employ a coded orthogonal frequency-division multiplexing (COFDM) scheme. COFDM is the same as orthogonal frequency-division multiplexing (OFDM) except that forward error correction is applied to the signal before transmission. OFDM is utilized in the terrestrial digital TV broadcasting system DVB-T (used in Europe) and integrated services digital broadcasting for terrestrial (ISDB-T) television broadcasting (used in Japan). COFDM is expected to be used in the future implementation of ATSC 3.0. COFDM is a multi-carrier modulation technique that can provide good performance in some wireless environments. In COFDM, the available bandwidth is divided into several orthogonal frequency sub-bands, which are also called subcarriers. The partial allocation of the data payload to each subcarrier protects it against frequency selective fading. The number of subcarriers may be dependent on the standard used.

Figure 2:
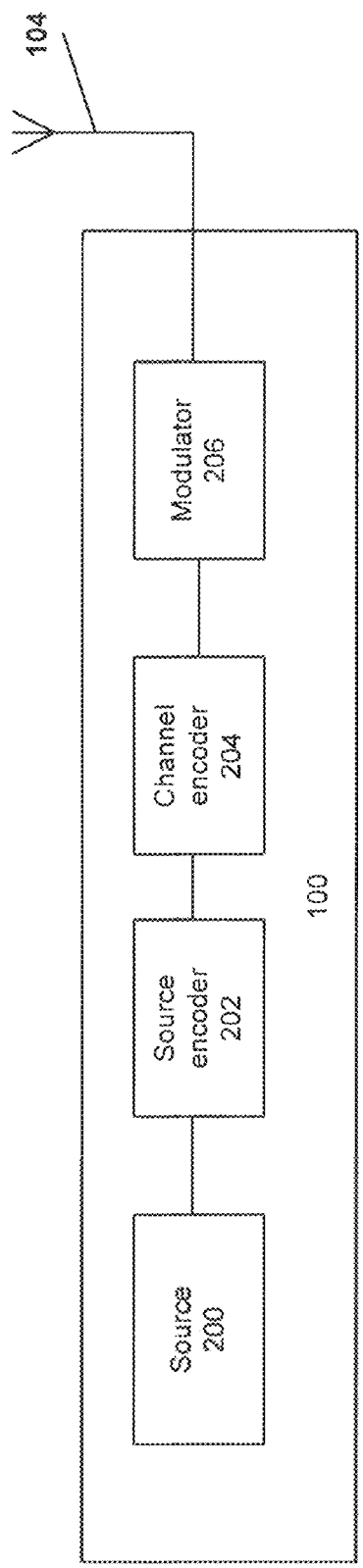
FIG. 2 is a schematic block diagram of an orthogonal frequency-division multiplexing (OFDM) transmitter according to one example.

FIG. 2 is a schematic block diagram of an OFDM transmitter according to one example. The transmitter 100 receives data from a source 200. The source 200 may be for audio, video, signaling, control or other data as would be understood by one of ordinary skill in the art. A source encoder 202 may include a data, audio, and video encoders to compress the audio, video and data. A channel encoder 204 may randomize, interleave, channel code, and frame map the compressed and signaling data. For example, the channel encoder 204 may include a frame builder that forms many data cells into sequences to be conveyed on OFDM symbols.

A modulator 206 (multiplexer) converts the processed digital data into modulation symbols, which can be, for example OFDM symbols (e.g., in the case of the proposed ATSC 3.0 standard). The multiplexed data is then passed to an inverse fast Fourier transformer (IFFT) which transforms a frequency domain signal into a time domain signal. The size of the IFFT is a function of the number of subcarriers, for example, in ATSC 3.0 the FFT and IFFT sizes may include 8K, 16K and 32K. A larger FFT size has the advantage of increased payload capacity while a smaller FFT size has the advantage of higher mobility.

The time domain signal is fed to a guard insertion module for generating a guard interval (GI) between symbols and then to a digital to analog (D/A) converter. The antenna 104 may perform up-conversion, RF amplification and over-the air broadcasting.

Figure 3:
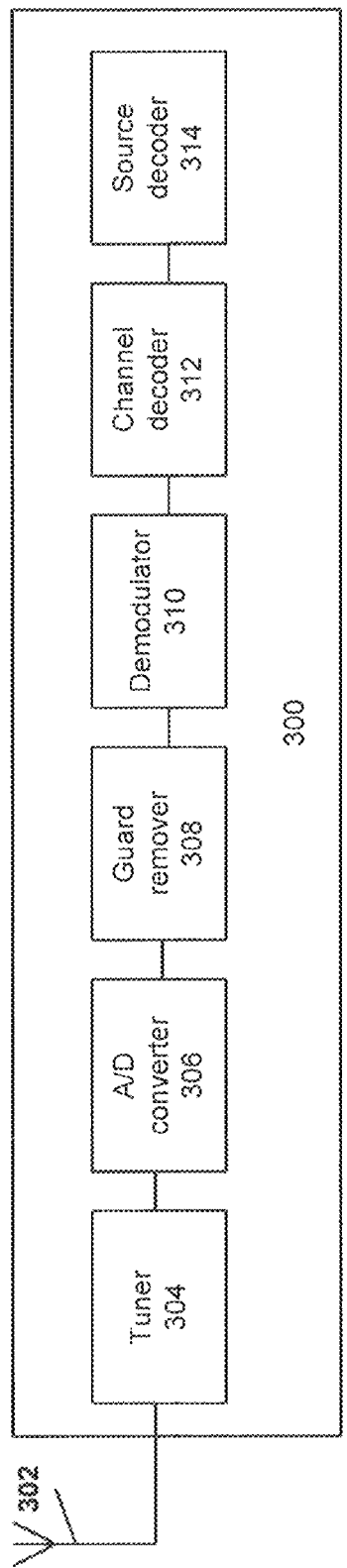
FIG. 3 is a schematic block diagram of an OFDM receiver according to one example.

FIG. 3 is a schematic block diagram of an OFDM receiver according to one example. The receiver 300 may be used to receive signals (e.g., digital television signals) transmitted from the transmitter 100 illustrated in FIG. 2. As shown in FIG. 3, an OFDM signal is received by an antenna 302 and detected by a tuner 304 and converted into digital form by an analog-to-digital converter (ADC) 306. A guard remover 308 removes the guard interval from a received OFDM symbol, before the payload data and pilot data is recovered from the OFDM symbol using a demodulator 310.

A channel decoder 312 recovers the compressed and ancillary data by performing error correcting decoding, de-interleaving and de-randomizing. Then, a source decoder 314 decompresses the audio and video data.

As it is understood by one of ordinary skill in the art, some of the components of the transmitter 100 and the receiver 300 shown in FIGS. 2 and 3 may not be necessary. For example, the antennas are not required when the transmission system is not over-the-air but over cable. In addition, some of the components of the transmitter and receiver are not illustrated in FIGS. 2 and 3, for example, the transmitter may include an error correction coder. Details of an exemplary OFDM transmitter and receiver may be found in the DVB-T2 standard (ETSI EN 302 755), which is incorporated herein by reference in its entirety.

Figure 4:
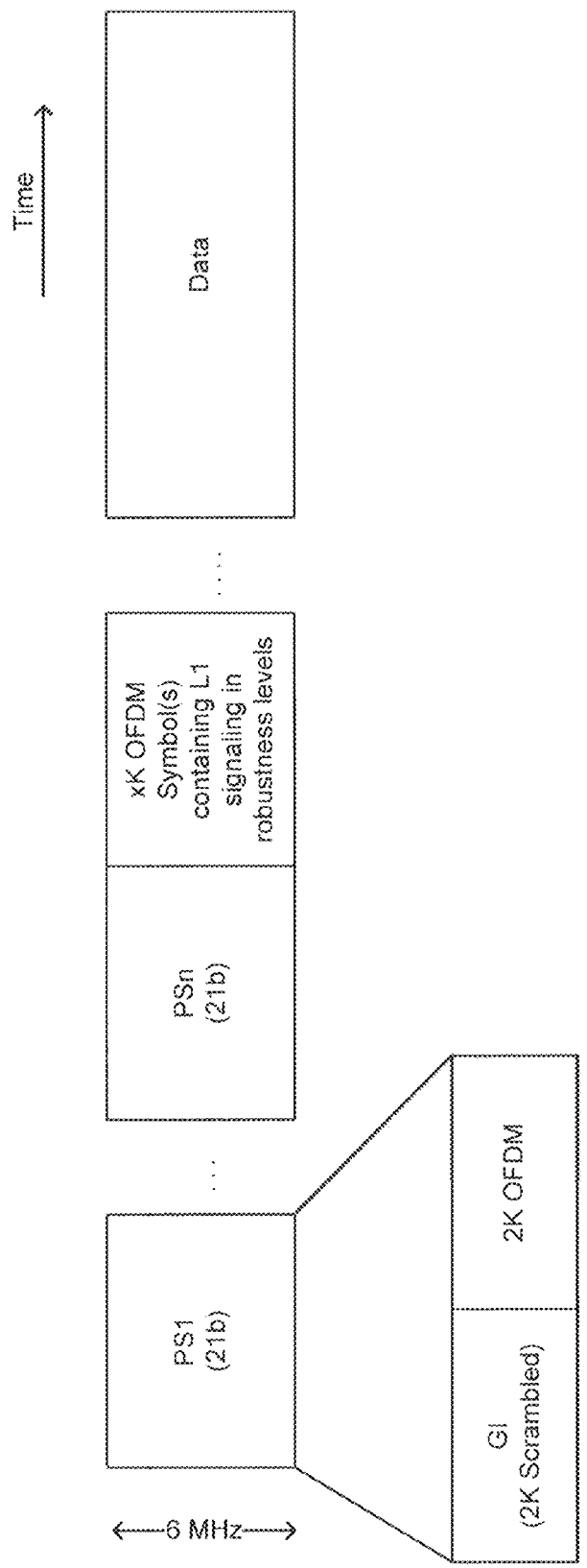
FIG. 4 shows an exemplary transmission frame structure according to one example.

FIG. 4 shows an exemplary transmission frame structure according to one example. The transmission frame includes a plurality of parts, for example a first part corresponding to a first subset of symbols (e.g., PS1-PSn) making up the transmission frame, a second part corresponding to a second subset of the symbols (e.g., xK OFDM Symbol(s) containing L1 signaling), and a third part corresponding to a third subset of the symbols (e.g., data). Each of these parts may include one or more symbols. Each of these parts may or may not have a same bandwidth. For example, one or more parts may have a bandwidth of six megahertz. In one embodiment, at least one of the plurality of parts has a bandwidth of six megahertz. One part may be a preamble. The preamble includes one or more symbols. The symbols may have different sequences for improved detection. Each of the symbols may include a guard interval and an OFDM portion where the OFDM portion represents the useful part of the symbol.

In one embodiment, signaling information is included in one or more parts of the transmission frame. In each of the one or more parts, the signaling information may be included in one or more symbols forming the respective part. This has the advantage of providing multiple levels of signaling via, for example, the preamble and/or signaling within other OFDM symbols. The signaling information may include sampling frequency, system bandwidth, and any other necessary fields.

In one embodiment, a first part may include signaling information for a second part that is subsequent to the first part. The last symbol (e.g., PSn) of the first part includes the signaling information for the second part (e.g., xK OFDM Symbol(s)). In addition, the second part (e.g., xK OFDM Symbol(s) may include signaling information for a third part (e.g., data) that is subsequent to the second part. For example, when the first part is a bootstrap and the second part is a preamble, the last symbol of the bootstrap includes signaling information for the preamble. In another example, the first part is referred to as a preamble part, the second part an L1 signaling part, and the third part a payload part.

In one embodiment, the second part carries the L1 signaling data for the following data symbols. The second part occurs before any data symbols corresponding to the third part of the frame. The third part may correspond to the payload. The L1 signaling provides the necessary information to configure the physical layer parameters (e.g., parameters used to decode the payload). The second part may have different formats (configurations); thus, one symbol occurring directly before the symbol carrying the L1 signaling may be used to identify the configuration. The signaling information may include a plurality of parameters that define the L1 signaling structure, including one or a combination of a modulation parameter (L1 mode), a FFT size, a guard interval, and a scattered pilot pattern (SPP).

Each of the parts configuration should be flexible and scalable to support a plurality of network types, network sizes, service types, and future expansions. Thus, the parameters may include different combinations of FFT sizes, guard intervals, scattered pilot patterns, and L1 modes. In addition, each part should be robust and resistant to channel impairments.

In one embodiment, L1 (layer-1) signaling may consist of two parts: L1-static and L1-dynamic. L1-static conveys signaling information which is static over the complete frame and also defines the parameters needed to decode L1-dynamic. L1-dynamic details the data format and the required information to decode the data payload. When the L1 signaling includes different parts (static and dynamic), the L1 mode as described in the present disclosure refers to the first part (L1 static), in one embodiment.

Further, each part of the plurality of parts may or may not use a same configuration. For example, the second part and the third part may or may not use a same configuration. Thus, the second part and the third part may need to be signaled. In one embodiment, the configuration may be one of allowable combinations of a FFT size, a guard interval, a frequency domain displacement component of a scattered pilot pattern (SPP), and a L1 mode for example to be defined in the proposed ATSC standard.

The receiver 300 starts by decoding the first part, which includes the information needed to decode the second part. Then the receiver 300 decodes the second part, which includes the information needed to decode the third part. The guard remover 308 removes the guard interval of a second part symbol based on the guard interval included in the signaled second part parameters. The demodulator 310 demodulates the second part symbol based on the FFT size and the SPP signaled in the second part parameters. The channel decoder 312 performs error-correcting decoding of the second part symbol based on the L1 mode.

In one embodiment, the first part may provide a universal entry point into a broadcast waveform. The first part may employ a fixed configuration known to all receivers. The first part includes one or more symbols. For example, the first part may include four symbols. A first symbol may be used for synchronization and indication of a version. A second symbol may be used to signal Emergency Alert System (EAS) information, system bandwidth, and a time interval to the next frame. A third symbol may indicate a sample rate. A fourth symbol may indicate the preamble structure. Each of the symbols may use a predefined number of bits.

In addition, the encoding parameter (L1 mode) may be chosen from seven modes. The L1 modes are related to the coding and modulation chosen which are a function of the power added to the signal. The L1 modes may represent allowable combinations of a code rate and modulation type used. For example, the modulation type may be QPSK, 16NUC, 64-NUC or the like. The code rate may be 3/15, 6/15, or the like. The L1 modes provide a range of robustness.

Table 1 shows exemplary signaling information that may be included in the plurality of parts of the transmission frame.

TABLE 1

Exemplary signaling information

| Category | Components | Bits | Service discovery |
|---|---|---|---|
| Boot/Sync | Major System Revision Number | 2 | Stage 1 |
| Boot/Sync | Minor System Revision Number | 2 | Stage 1 |
| Boot/Sync | Next Frame Time start | 5 | Stage 1 |
| Boot/Sync | Emergency Alert | 1 | Stage 1 |
| Boot/Sync | Pilot Pattern | 3 | Stage 1 |
| Boot/Sync | Extension Indicator | 1 | Stage 1 |
| Boot/Sync | Extension Length | 8 | Stage 1 |

TABLE 1-continued

Exemplary signaling information

| Category | Components | Bits | Service discovery |
|---|---|---|---|
| Boot/Sync | Sampling Frequency | 3 | Stage 2 |
| Boot/Sync | System Bandwidth | 2 | Stage 1 |
| Boot/Sync | Carrier Frequency | 10 | Stage 1 |
| | | 37 | |
| Basic System Data | Service Type | 3 | Stage 2 |
| Basic System Data | UTC Time data | 64 | Stage 2 |
| Basic System Data | Pre-distortion (MISO) type | 4 | Stage 2 |
| Basic System Data | Num. PLPs | 6 | Stage 2 |
| Basic System Data | EAS version | 4 | Stage 2 |
| Basic System Data | EAS ID | 4 | Stage 2 |
| Basic System Data | EAS Message Index | 8 | Stage 2 |
| Basic System Data | EAS Locality Index | 8 | Stage 2 |
| | | 101 | |
| Per Service data | Pilot Configuration | 3 | Stage 2 |
| Per Service data | Resource Allocation | 4 | Stage 2 |
| Per Service data | Inner FEC Type | 4 | Stage 2 |
| Per Service data | Outer FEC Type | 2 | Stage 2 |
| Per Service data | Modulation/Code rate | 6 | Stage 2 |
| Per Service data | Transport Type | 3 | Stage 2 |
| Per Service data | Baseband Scrambler Type | 3 | Stage 2 |
| Per Service data | PLP Group No | 6 | Stage 2 |

In one embodiment, the first part is a bootstrap, the second part is a preamble, and the third part is a payload. The bootstrap may include four symbols. The preamble includes one or more symbols. The last symbol of the bootstrap includes signaling information needed to decode one or more symbols of the preamble. The preamble includes signaling information needed to decode the payload. For example, the preamble may include L1 signaling. The L1 signaling may consist of two part parts. One of the two parts may include the necessary information to decode the payload. The preamble occurs before any data symbol corresponding to the payload of the transmission frame. The preamble symbols may have different sequences for improved detection. In one embodiment, each of the symbols of, for example the bootstrap, uses 21 bits. The payload may have a bandwidth of six megahertz.

Figure 5:
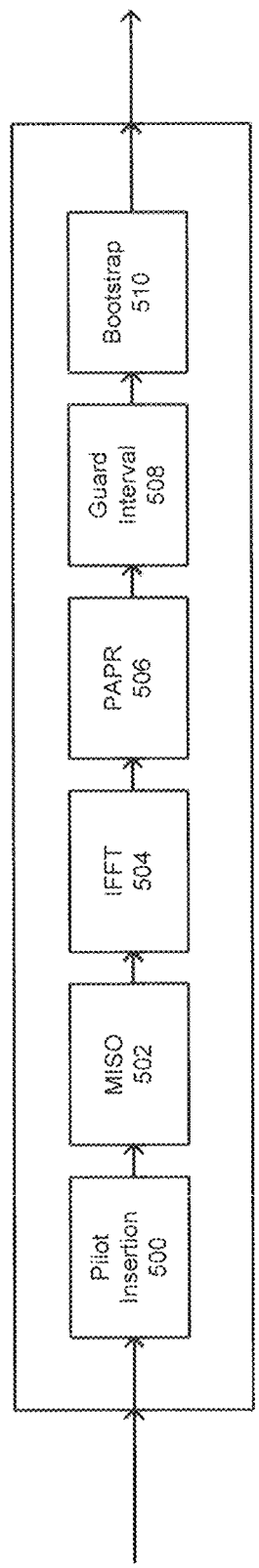
FIG. 5 is a schematic block diagram for wave generation according to one example.

FIG. 5 is a schematic block diagram that shows the waveform generation according to one example. The waveform generation may include the following modules that are implemented by one or a combination of programmable or hardwired circuitry. The pilot insertion module 500 inserts the pilots as specified by the broadcaster. Then, the signal is passed to a multiple input single output (MISO) module 502. The resultant signal is passed through an IFFT module 504. Then, peak-to-average power reduction (PAPR) techniques can be applied by a PAPR module 506. A guard interval module 508 inserts a repeated portion of the COFDM waveform. The GI length may be chosen to match the level of multipath expected. Finally, a bootstrap module 510 affixes the bootstrap or the first part of the transmission frame to the front of each frame.

Figure 6:
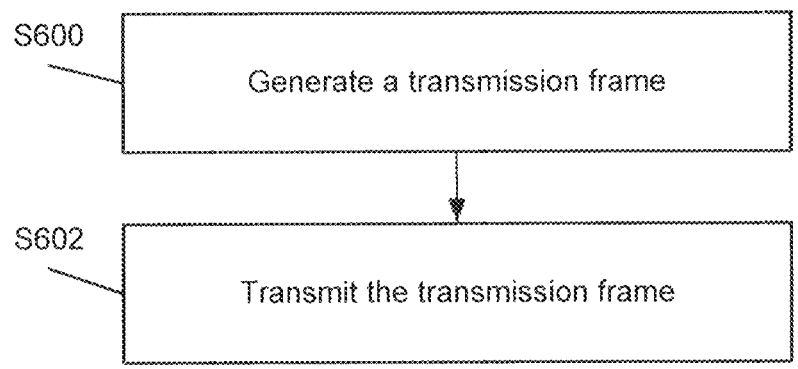
FIG. 6 is a flow chart that shows the signaling method according to one example.

FIG. 6 is a flow chart that shows the signaling method according to one example. At step S600, a transmission frame is generated by the transmitter 100 using processing circuitry. In one embodiment, the frame includes three parts. The last symbol of the first part includes signaling information needed by receiver to decode the second part. The last symbol may be generated using the signaling information directly or by referencing a look-up table stored in the transmitter 100 to determine the pattern corresponding to the parameters of the second part as set by the broadcaster. In certain embodiments, one or more look-up tables are referenced, as described in U.S. patent application Ser. No. 14/746,541, which is incorporated by reference in its entirety. In other embodiments, the look-up table is stored at a remote location or the pattern is provided directly to the transmitter 100 by an operator. At step S602, the frame is transmitted.

Figure 7:
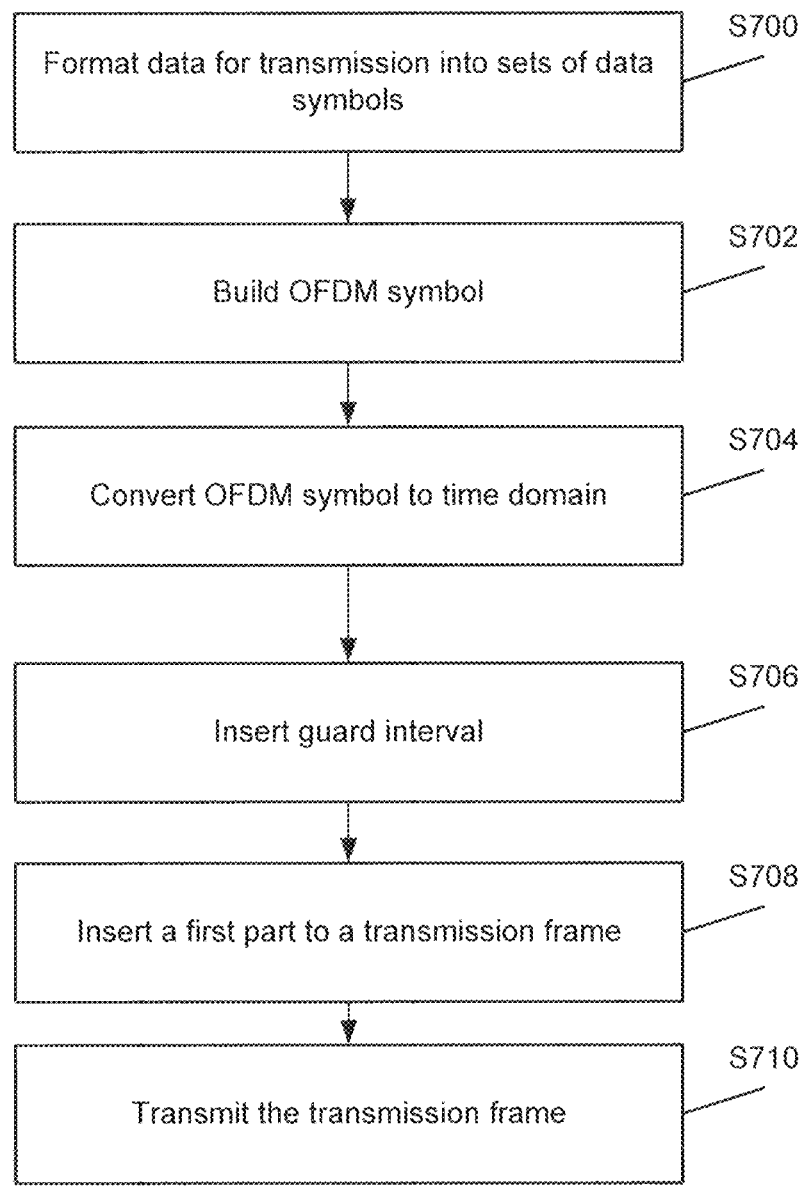
FIG. 7 is a flow chart that shows the operation of the transmitter according to one example.

FIG. 7 is a flow chart that shows the operation of the transmitter according to one example. At step S700, the transmitter 100 forms sets of data symbols for each OFDM symbol. Each set of symbols may correspond to an amount of data which can be carried by an OFDM symbol. At step S702, the transmitter 100 may combine the data symbols with pilot symbols. At step 704, the transmitter 100 modulates the data to form OFDM symbols in the frequency domain. Then, the transmitter 100 performs an IFFT to transform the OFDM symbols from the frequency domain into the time domain. At step S706, the transmitter 100 adds a guard interval by copying a part of the OFDM symbols. At step S708, the transmitter 100 may generate one or more symbols that forms the first part of the frame. As discussed above the first part may be used for synchronization and indication of a version, and for indication of EAS information. In one embodiment, the transmitter 100, using the processing circuitry, may check whether the broadcaster has indicated a configuration for the second part. In response to determining that the broadcaster has indicated the configuration for the second part, the transmitter 100 may use the indicated configuration and in certain embodiments at least one look-up table to determine the corresponding pattern. In response to determining that the broadcaster has not indicated a configuration for the second part, a default configuration may be used. The look-up table may also be associated with the version. Thus, a plurality of look-up tables may be stored in the memory of the transmitter or at a remote location. At step S710, the frame is transmitted.

Figure 8:
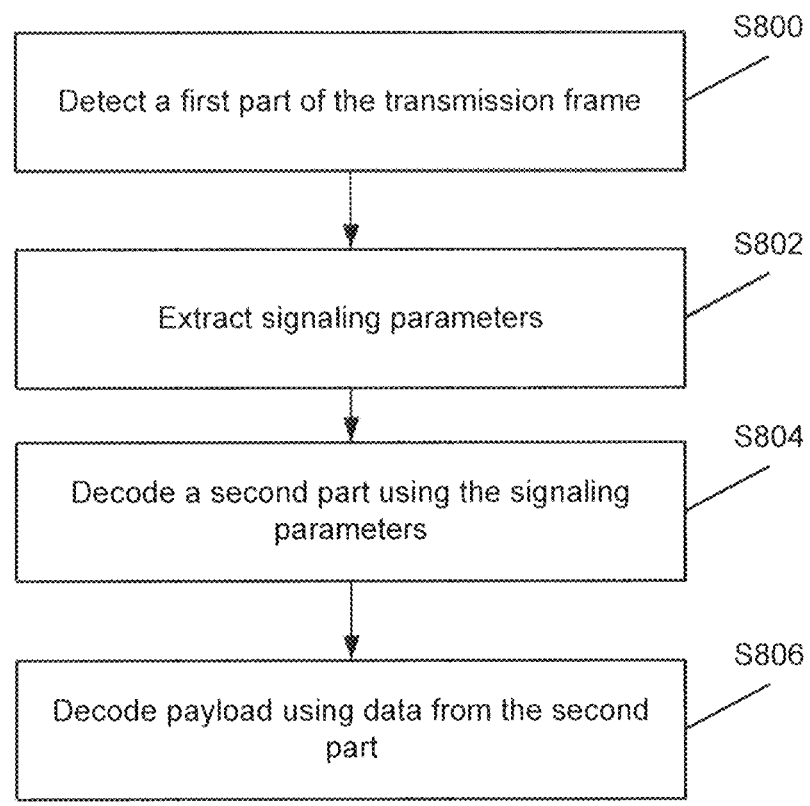
FIG. 8 is a flow chart that shows the operation of the receiver according to one example.

FIG. 8 is a flow chart that shows the operation of the receiver according to one example. At step S800, the receiver 300 detects the first part of the transmission frame. The first part is detected from a received digital television signal according to one embodiment. The receiver detects the bits (e.g., 7 or 8) in the last symbol of the first part. At step S802, the receiver 300 extracts the signaling parameters from the first part or determines signaling patterns representing the signaled parameters by referencing at least one look-up table stored in the memory or a remote location (e.g., a predetermined server). For example, the transmitter 100 may utilize more than one look-up table when the second parameters (e.g., the L1 mode) are signaled separately. At step S804, the receiver 300 decodes the second part using the signaling parameters extracted at step S802. At step S806, the receiver 300 decodes the data payload using signaling information included in the second part.

The receiver circuitry illustrated in FIG. 3 generally operates under control of at least one processor, such as a CPU, which is coupled to memory, program memory, and a graphics subsystem via one or more buses. An exemplary computer for controlling the receiver circuitry is further described below with respect to FIG. 11. Similarly, the transmission circuitry illustrated in FIG. 2 is operated under control of at least one processor.

Figure 9:
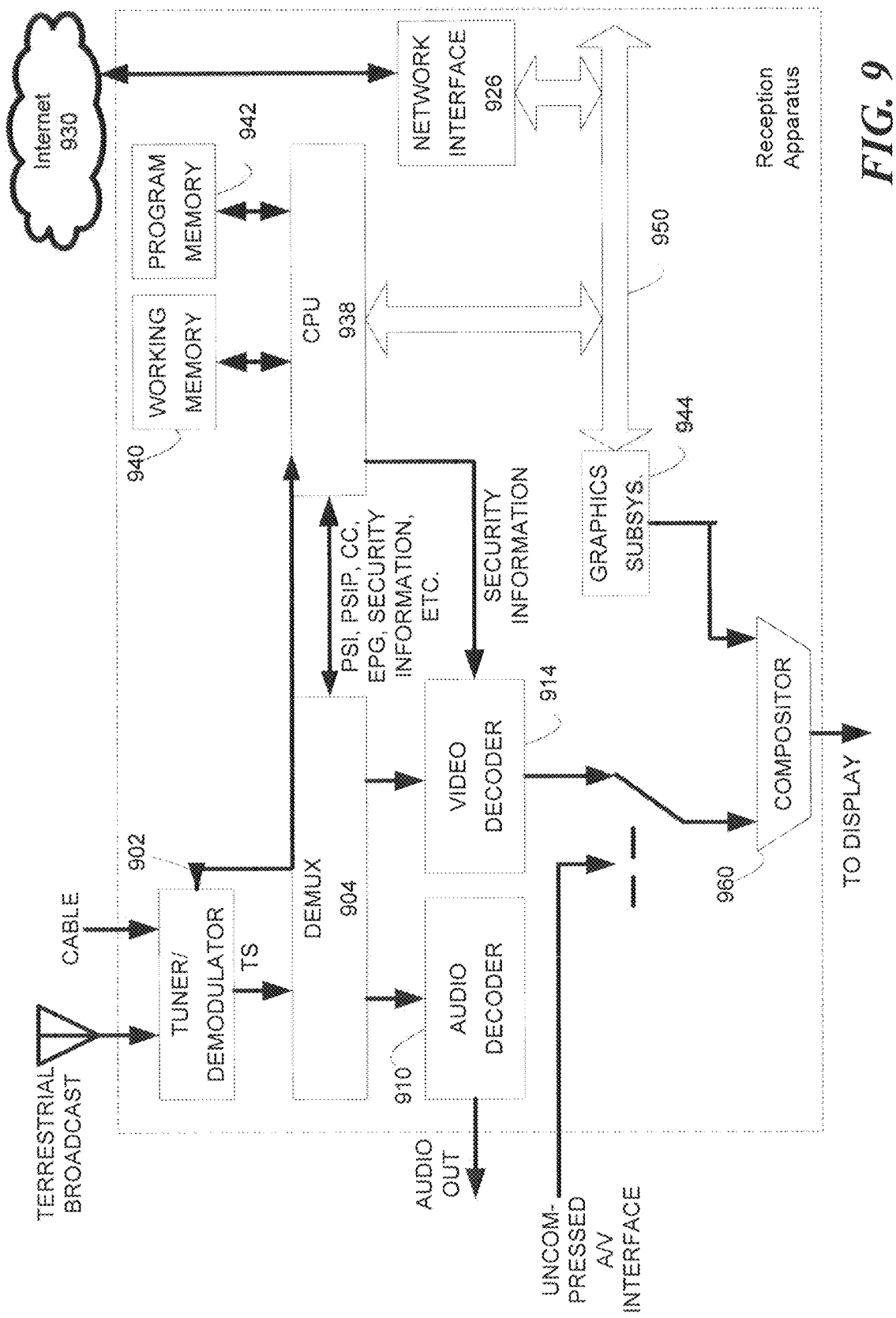
FIG. 9 illustrates an exemplary reception apparatus.

FIG. 9 illustrates an exemplary reception apparatus, which is configured to implement the process of FIG. 8 in certain embodiments. The reception apparatus includes a digital television receiver device that is incorporated into a fixed or mobile device such as a television set, a set top box, smartphone, tablet computer, laptop, portable computer, or any other device configured to receive television content. The reception apparatus may also be incorporated in a vehicle.

The reception apparatus includes a tuner/demodulator 902, which receives digital television broadcast signals from one or more content sources (e.g., content source) via, for example, a terrestrial broadcast. The tuner/demodulator 902 includes one of the receiver circuitry illustrated in FIG. 3 in certain embodiments. Depending on the embodiment, the reception apparatus may alternatively or additionally be configured to receive a cable television transmission or a satellite broadcast. The tuner/demodulator 902 receives a signal, including for example an MPEG-2 TS or IP packets, which may be demultiplexed by the demultiplexer 904 or handled by middleware and separated into audio and video (A/V) streams. The audio is decoded by an audio decoder 910 and the video is decoded by a video decoder 914. Further, uncompressed A/V data may be received via an uncompressed A/V interface (e.g., a HDMI interface), if available.

In one embodiment, the received signal (or stream) includes supplemental data such as one or a combination of closed caption data, a triggered declarative object (TDO), a trigger, a virtual channel table, EPG data, NRT content, etc. Examples of the TDO and trigger are described in ATSC Candidate Standard: Interactive Services Standard (A/105: 2015), S13-2-389r8, which is incorporated herein by reference in its entirety. The supplemental data are separated out by the demultiplexer 904. However, the A/V content and/or the supplemental data may be received via the Internet 930 and a network interface 926.

A storage unit may be provided to store non real time content (NRT) or Internet-delivered content such as Internet Protocol Television (IPTV). The stored content can be played by demultiplexing the content stored in the storage unit by the demultiplexer 904 in a manner similar to that of other sources of content. Alternatively, the stored content may be processed and presented to the user by the CPU 938. The storage unit may also store any other supplemental data acquired by the reception apparatus.

The reception apparatus generally operates under control of at least one processor, such as the CPU 938, which is coupled to a working memory 940, program memory 942, and a graphics subsystem 944 via one or more buses (e.g., bus 950). The CPU 938 receives closed caption data from the demultiplexer 904 as well as any other supplemental data used for rendering graphics, and passes appropriate instructions and data to the graphics subsystem 944. The graphics outputted by the graphics subsystem 944 are combined with video images by the compositor and video interface 960 to produce an output suitable for display on a video display.

Further, the CPU 938 operates to carry out functions of the reception apparatus including the processing of NRT content, triggers, TDOs, EPG data, etc. For example, the CPU 938 operates to execute script objects (control objects) contained in the TDO, its trigger(s), etc., using for example a Declarative Object (DO) Engine stored in the program memory 942.

Although not illustrated in FIG. 9, the CPU 938 may be coupled to any one or a combination of the reception apparatus resources to centralize control of one or more functions. In one embodiment, the CPU 938 also operates to oversee control of the reception apparatus including the tuner/demodulator 902 and other television resources. For example, FIG. 10 shows one implementation of CPU 938.

Figure 10:
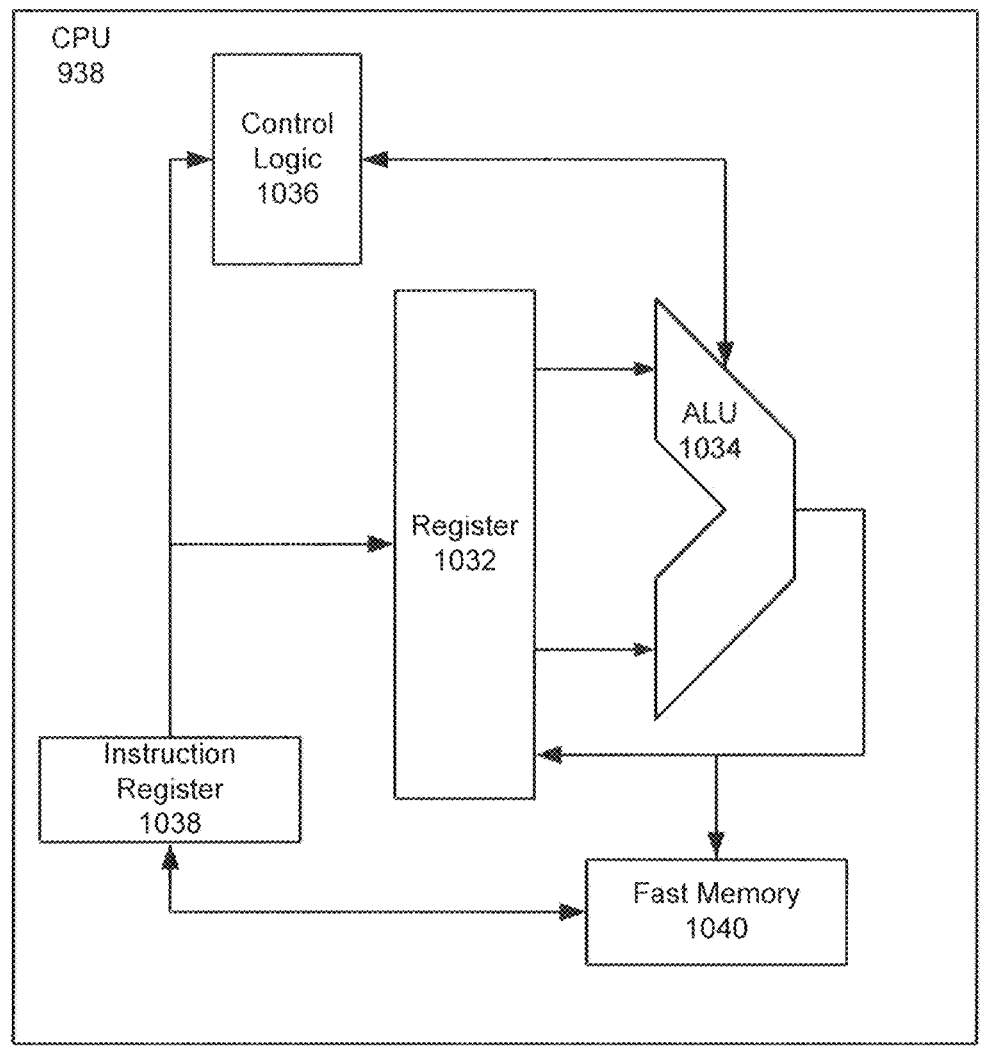
FIG. 10 is an exemplary block diagram of a central processing unit according to one example.

FIG. 10 illustrates one implementation of CPU 938, in which the instruction register 1038 retrieves instructions from the fast memory 1040. At least part of these instructions are fetched from the instruction register 1038 by the control logic 1036 and interpreted according to the instruction set architecture of the CPU 938. Part of the instructions can also be directed to the register 1032. In one implementation, the instructions are decoded according to a hardwired method, and in another implementation, the instructions are decoded according a microprogram that translates instructions into sets of CPU configuration signals that are applied sequentially over multiple clock pulses. After fetching and decoding the instructions, the instructions are executed using the arithmetic logic unit (ALU) 1034 that loads values from the register 1032 and performs logical and mathematical operations on the loaded values according to the instructions. The results from these operations can be feedback into the register and/or stored in the fast memory 1040. According to certain implementations, the instruction set architecture of the CPU 938 can use a reduced instruction set architecture, a complex instruction set architecture, a vector processor architecture, a very large instruction word architecture. Furthermore, the CPU 938 can be based on the Von Neuman model or the Harvard model. The CPU 938 can be a digital signal processor, an FPGA, an ASIC, a PLA, a PLD, or a CPLD. Further, the CPU 938 can be an x86 processor by Intel or by AMD; an ARM processor, a Power architecture processor by, e.g., IBM; a SPARC architecture processor by Sun Microsystems or by Oracle; or other known CPU architecture.

Figure 11:
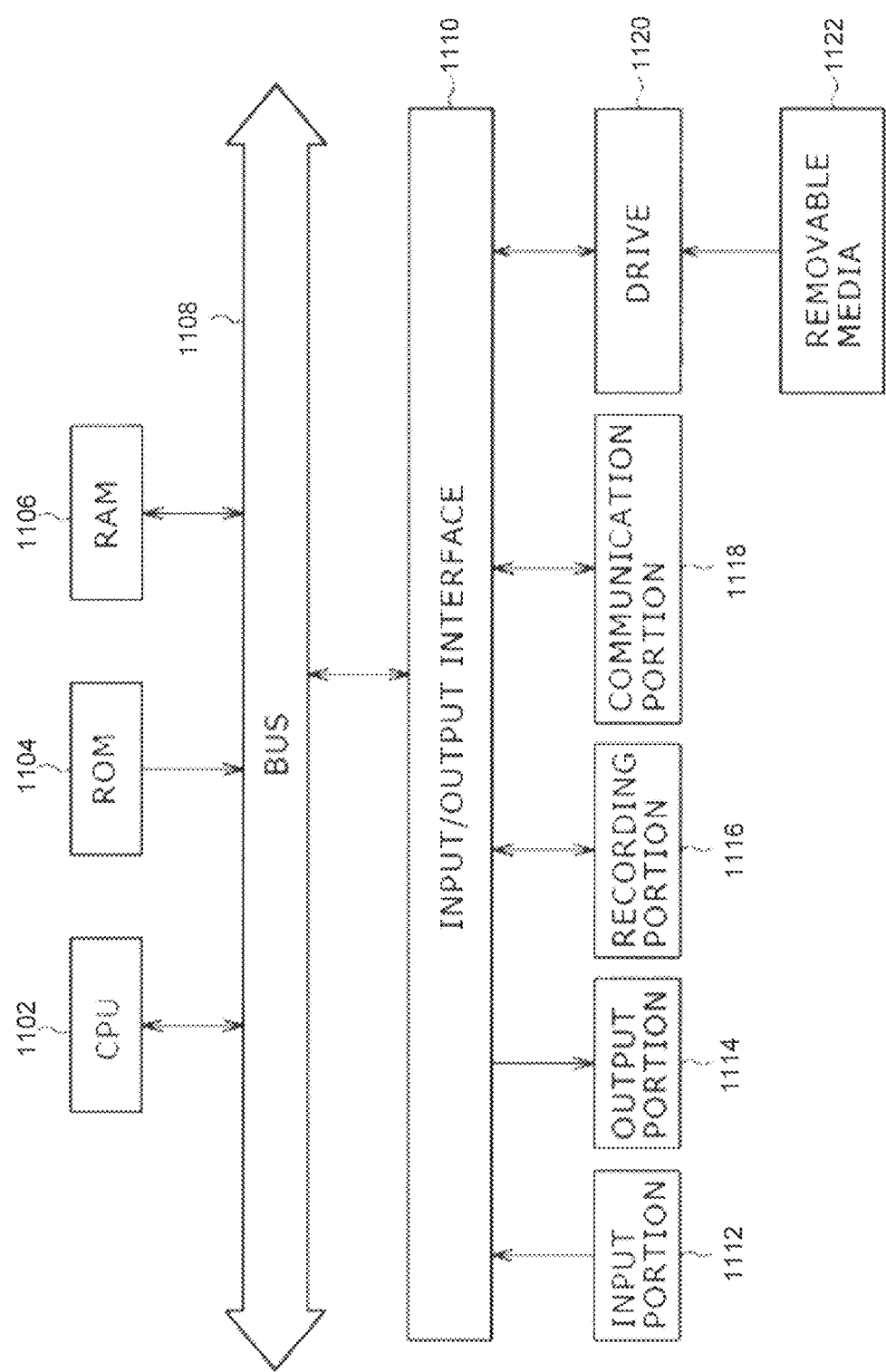
FIG. 11 is a block diagram showing an example of a hardware configuration of a computer.

FIG. 11 is a block diagram showing an example of a hardware configuration of a computer that can be configured to perform functions of any one or a combination of reception apparatus and transmission apparatus. For example, in one embodiment, the computer is configured to perform the functions in the digital domain, such as the modulator 206, channel encoder 204, demodulator 310, the transmitter 100, the receiver 300, or the reception apparatus illustrated in FIG. 9.

As illustrated in FIG. 11 the computer includes a central processing unit (CPU) 1102, read only memory (ROM) 1104, and a random access memory (RAM) 1106 interconnected to each other via one or more buses 1108. The one or more buses 1108 are further connected with an input-output interface 1110. The input-output interface 1110 is connected with an input portion 1112 formed by a keyboard, a mouse, a microphone, remote controller, etc. The input-output interface 1110 is also connected an output portion 1114 formed by an audio interface, video interface, display, speaker and the like; a recording portion 1116 formed by a hard disk, a non-volatile memory or other non-transitory computer readable storage medium; a communication portion 1118 formed by a network interface, modem, USB interface, fire wire interface, etc.; and a drive 1120 for driving removable media 1122 such as a magnetic disk, an optical disk, a magneto-optical disk, a semiconductor memory, etc.

According to one embodiment, the CPU 1102 loads a program stored in the recording portion 1116 into the RAM 1106 via the input-output interface 1110 and the bus 1108, and then executes a program configured to provide the functionality of the one or combination of the perform the functions in the digital domain, such as the modulator 206, channel encoder 204, demodulator 310, the transmitter 100, the receiver 300, or the reception apparatus illustrated in FIG. 9.

The hardware description above, exemplified by any one of the structure examples shown in FIGS. 10 and 11, constitutes or includes specialized corresponding structure that is programmed or configured to perform the algorithm shown in FIGS. 6, 7 and 8. For example, the algorithm shown in FIG. 6 may be completely performed by the circuitry included in the single device shown in FIG. 11.

Obviously, numerous modifications and variations are possible in light of the above teachings. It is therefore to be understood that within the scope of the appended claims, the embodiments of the present disclosure may be practiced otherwise than as specifically described herein. For example, any of the different methods described above may be applied to any of the parts of a frame.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative, but not limiting of the scope of the present disclosure, as well as other claims. The disclosure, including any readily discernible variants of the teachings herein, defines, in part, the scope of the foregoing claim terminology such that no inventive subject matter is dedicated to the public.

The above disclosure also encompasses the embodiments noted below.

(1) A method for signaling parameters, the method includes generating, using processing circuitry of a transmission apparatus, a transmission frame, the transmission frame including a plurality of parts and a last symbol in a first one of the plurality of parts including signaling information for decoding a second one of the plurality of parts; and transmitting the transmission frame.

(2) The method of feature (1), in which the second one of the plurality of parts contains L1 signaling information.

(3) The method of feature (1) or (2), in which the signaling information includes one or a combination of an FFT size, a guard interval size and a pilot pattern.

(4) The method of any one of features (1) to (3), in which the second one of the plurality of parts includes signaling data for a third one of the plurality of parts.

(5) The method of feature (4), in which the third one of the plurality of parts is a payload.

(6) The method of any one of features (1) to (5), in which the transmission frame only includes three parts.

(7) The method of any one of features (1) to (6), in which at least one of the plurality of parts has a bandwidth of six megahertz.

(8) The method of any one of features (1) to (7), in which the first one of the plurality of parts is a preamble.

(9) The method of any one of features (1) to (7), in which the first one of the plurality of parts is a bootstrap.

(10) A transmission apparatus, including a memory, and circuitry configured to generate a transmission frame, the transmission frame including a plurality of parts and a last symbol in a first one of the plurality of parts including signaling information for decoding a second one of the plurality of parts, and transmit the transmission frame.

(11) The transmission apparatus of feature (10), in which the second one of the plurality of parts contains L1 signaling information.

(12) The transmission apparatus of feature (10) or (11), in which the signaling information includes one or a combination of an FFT size, a guard interval size and a pilot pattern.

(13) The transmission apparatus of any one of features (10) to (12), in which the second one of the plurality of parts includes signaling data for a third one of the plurality of parts.

(14) The transmission apparatus of feature (13), in which the third one of the plurality of parts is a payload.

(15) The transmission apparatus of any one of features (10) to (14), in which the transmission frame only includes three parts.

(16) The transmission apparatus of any one of features (10) to (15), in which at least one of the plurality of parts has a bandwidth of six megahertz.

(17) The transmission apparatus of any one of features (10) to (16), in which the first one of the plurality of parts is a preamble.

(18) The transmission apparatus of any one of features (10) to (16), in which the first one of the plurality of parts is a bootstrap.

(19) A method for decoding a part of a transmission frame, the method including detecting, using processing circuitry of a reception apparatus, a last symbol of a first part of the transmission frame; and extracting, using the processing circuitry, signaling parameters to decode a second part of the transmission frame from the last symbol of the first part of the transmission frame.

(20) The method of feature (19), in which the second one of the plurality of parts contains L1 signaling information.

(21) The method of feature (19) or (20), in which the signaling information includes one or a combination of an FFT size, a guard interval size and a pilot pattern.

(22) The method of any one of features (19) to (21), in which the second one of the plurality of parts includes signaling data for a third one of the plurality of parts.

(23) The method of feature (22), in which the third one of the plurality of parts is a payload.

(24) The method of any one of features (19) to (23), in which the transmission frame only includes three parts.

(25) The method of any one of features (19) to (24), in which at least one of the plurality of parts has a bandwidth of six megahertz.

(26) The method of any one of features (19) to (25), in which the first one of the plurality of parts is a preamble.

(27) The method of any one of features (19) to (25), in which the first one of the plurality of parts is a bootstrap.

(28) A reception apparatus, including a memory; and circuitry configured to detect a last symbol of a first part of a transmission frame, and extract signaling parameters to decode a second part of the transmission frame from the last symbol of the first part of the transmission frame.

(29) The reception apparatus of feature (28), in which the second one of the plurality of parts contains L1 signaling information.

(30) The reception apparatus of feature (28) or (29), in which the signaling information includes one or a combination of an FFT size, a guard interval size and a pilot pattern.

(31) The reception apparatus of any one of features (28) to (30), in which the second one of the plurality of parts includes signaling data for a third one of the plurality of parts.

(32) The reception apparatus of feature (31), in which the third one of the plurality of parts is a payload.

(33) The reception apparatus of any one of features (28) to (32), in which the transmission frame only includes three parts.

(34) The reception apparatus of any one of features (28) to (33), in which at least one of the plurality of parts has a bandwidth of six megahertz.

(35) The reception apparatus of any one of features (28) to (34), in which the first one of the plurality of parts is a preamble.

(36) The reception apparatus of any one of features (28) to (34), in which the first one of the plurality of parts is a bootstrap.

(37) A non-transitory computer-readable medium storing instructions, which when executed by a computer, causes the computer to perform the method of any one of features (1) to (9).

(38) A non-transitory computer-readable medium storing instructions, which when executed by a computer, causes the computer to perform the method of any one of features (19) to (27).

The invention claimed is:

1. A method for signaling parameters, the method comprising:

generating, using processing circuitry of a transmission apparatus, a transmission frame, the transmission frame including a plurality of parts and a last symbol in a first part of the plurality of parts indicating signaling parameters for decoding a second part of the plurality of parts; and transmitting the transmission frame, wherein the second part includes signaling data for decoding a third part of the plurality of parts, the first part is a bootstrap, the second part is a preamble, the third part is a payload, and the signaling parameters for decoding the second part of the plurality of parts are extracted from the last symbol in the first part of the plurality of parts based on a look-up table.

2. The method of claim 1, wherein the second part contains L1 signaling information.

3. The method of claim 1, wherein the signaling parameters extracted from the first part includes one or a combination of an FFT size, a guard interval size and a pilot pattern.

4. The method of claim 1, wherein at least one of the first, second, or third parts has a bandwidth of six megahertz.

5. The method of claim 1, wherein the last symbol in the first part of the plurality of parts indicates the signaling parameters for decoding the second part of the plurality of parts irrespective of a number of symbols in the first part of the plurality of parts.

6. A transmission apparatus, comprising:

a memory; and circuitry configured to generate a transmission frame, the transmission frame including a plurality of parts and a last symbol in a first part of the plurality of parts indicating signaling parameters for decoding a second part of the plurality of parts; and transmit the transmission frame, wherein the second part includes signaling data for decoding a third part of the plurality of parts, the first part is a bootstrap, the second part is a preamble, the third part is a payload, and the signaling parameters for decoding the second part of the plurality of parts are extracted from the last symbol in the first part of the plurality of parts based on a look-up table.

7. The transmission apparatus of claim 6, wherein the second part contains L1 signaling information.

8. The transmission apparatus of claim 6, wherein the signaling parameters extracted from the first part includes one or a combination of an FFT size, a guard interval size and a pilot pattern.

9. The transmission apparatus of claim 6, wherein at least one of the first, second, or third parts has a bandwidth of six megahertz.

10. The transmission apparatus of claim 6, wherein the last symbol in the first part of the plurality of parts indicates the signaling parameters for decoding the second part of the plurality of parts irrespective of a number of symbols in the first part of the plurality of parts.

11. A method for decoding a part of a transmission frame, the method comprising:

detecting, using processing circuitry of a reception apparatus, a last symbol of a first part of the transmission frame; and extracting, using the processing circuitry, signaling parameters to decode a second part of the transmission frame from the last symbol of the first part of the transmission frame based on a look-up table, wherein the second part includes signaling data for decoding a third part of the transmission frame, the first part is a bootstrap, the second part is a preamble, and the third part is a payload.

12. The method of claim 11, wherein the second part contains L1 signaling information.

13. The method of claim 11, wherein the signaling parameters extracted from the first part includes one or a combination of an FFT size, a guard interval size and a pilot pattern.

14. The method of claim 11, wherein at least one of the first, second, or third parts has a bandwidth of six megahertz.

15. The method of claim 11, wherein the last symbol of the first part of the transmission frame indicates the signaling parameters for decoding the second part of the transmission frame irrespective of a number of symbols in the first part of the transmission frame.

16. A reception apparatus, comprising:

a memory; and circuitry configured to detect a last symbol of a first part of a transmission frame, and extract signaling parameters to decode a second part of the transmission frame from the last symbol of the first part of the transmission frame based on a look-up table, wherein the second part includes signaling data for decoding a third part of the transmission frame, the first part is a bootstrap, the second part is a preamble, and the third part is a payload.

17. The reception apparatus of claim 16, wherein the second part contains L1 signaling information.

18. The reception apparatus of claim 16, wherein the signaling parameters extracted from the first part includes one or a combination of an FFT size, a guard interval size and a pilot pattern.

19. The reception apparatus of claim 16, wherein at least one of the first, second, or third parts has a bandwidth of six megahertz.

20. The reception apparatus of claim 16, wherein the last symbol of the first part of the transmission frame indicates the signaling parameters for decoding the second part of the transmission frame irrespective of a number of symbols in the first part of the transmission frame.

* * * * *